April 8, 1958  A. CROT  2,829,661
PORTABLE CABANA ATTACHMENT FOR AUTOMOBILES
Filed Sept. 28, 1956  2 Sheets-Sheet 1
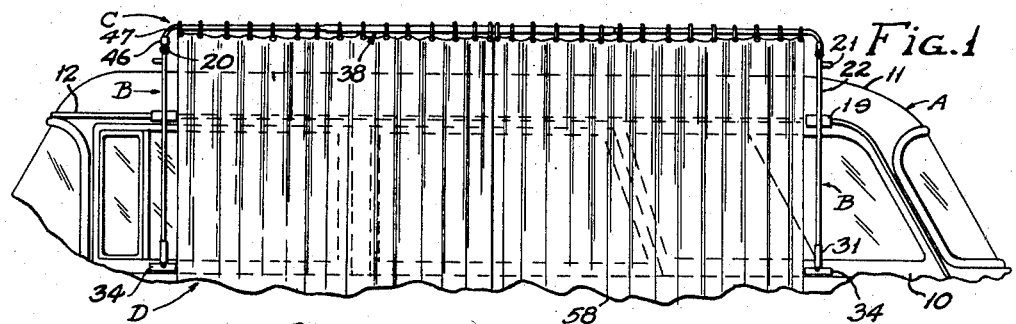
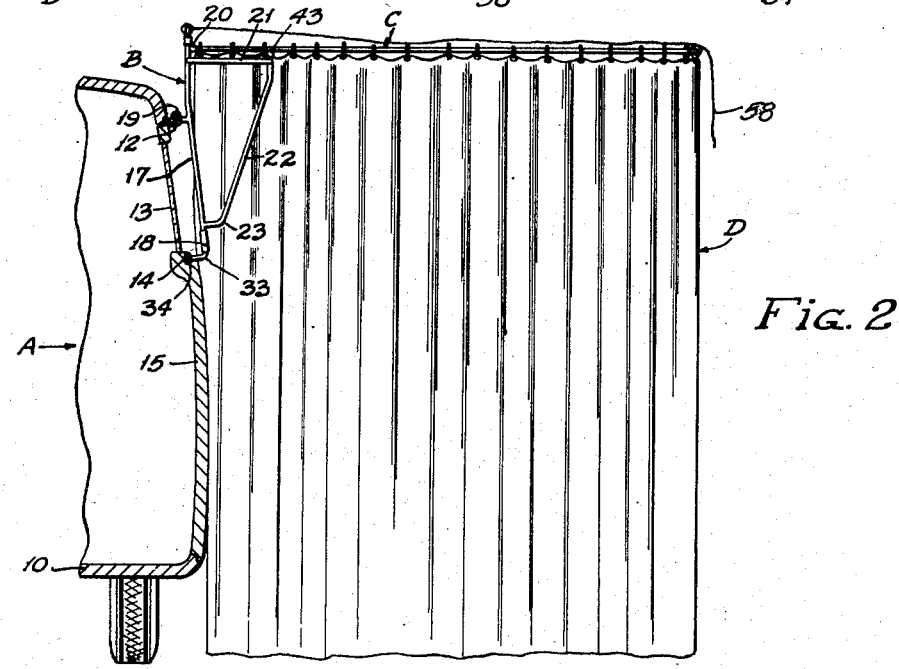
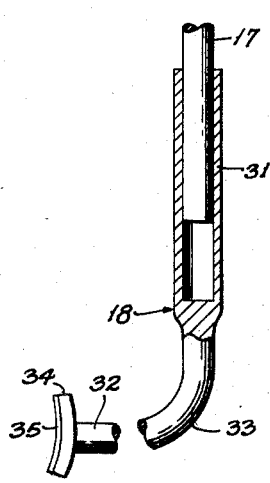
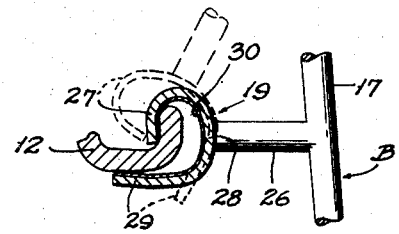
INVENTOR.
ANDRE CROT
BY
Lynn N. Latta
—ATTORNEY—

April 8, 1958  A. CROT  2,829,661
PORTABLE CABANA ATTACHMENT FOR AUTOMOBILES
Filed Sept. 28, 1956  2 Sheets-Sheet 2
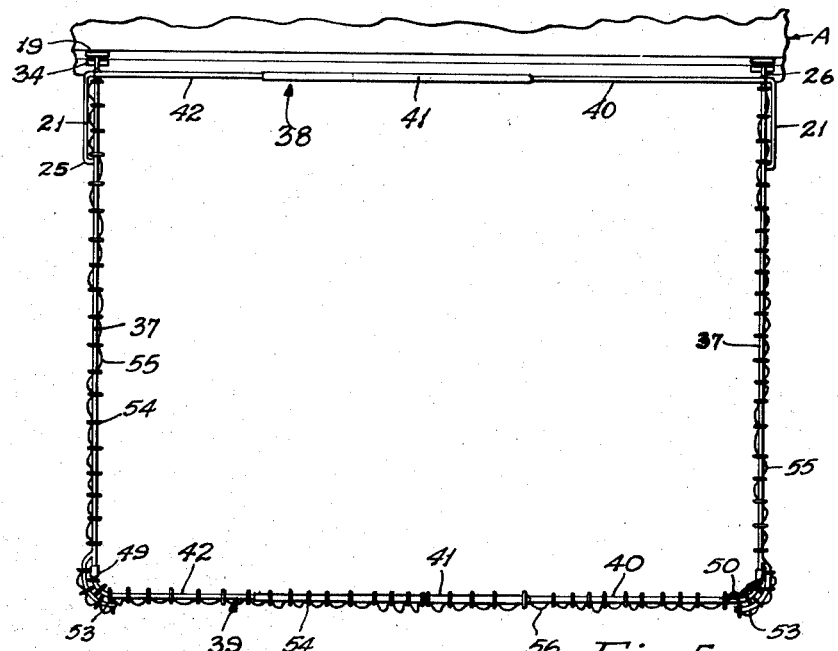
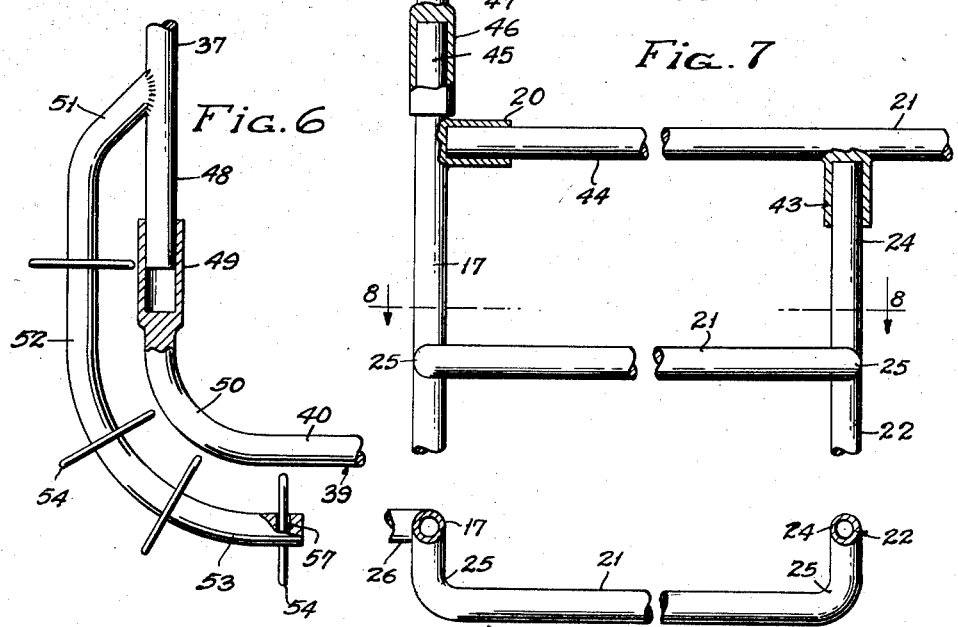
INVENTOR.
ANDRE CROT
BY
Lynn H Latta
ATTORNEY

# United States Patent Office 2,829,661
Patented Apr. 8, 1958

2,829,661

PORTABLE CABANA ATTACHMENT FOR AUTOMOBILES

André Crot, Topango, Calif.

Application September 28, 1956, Serial No. 612,787

10 Claims. (Cl. 135—8)

This invention relates generally to camping equipment and in particular to apparatus for attachment to the side of an automobile to provide an enclosed space which may be utilized as a dressing room or as a combined dressing room and shower stall.

A particular object of the invention is to provide a knock-down attachment apparatus which can be reduced to a relatively small package and stowed in the trunk compartment of an automobile along with other luggage.

A further object is to provide an extremely light-weight and relatively inexpensive attachment apparatus of the character indicated.

A further object is to provide such an attachment apparatus having means cooperating with the rain gutter and the side of an automobile for mounting the same thereon. More specifically, the invention contemplates such an attachment apparatus which can be hooked into the rain gutter and allowed to simply rest against the side of the vehicle by gravity for providing cantilever support of the apparatus in a position extended laterally beyond the side of the automobile.

Another object is to provide such an apparatus which may derive full support, through engagement with the gutter and the side trim bead of an automobile.

A still further object is to provide a light-weight attachment apparatus which can readily be manipulated and installed by any person and as readily detached from the automobile and stowed.

Other objects and advantages will become apparent in the ensuing specifications and appended drawings in which:

Fig. 1 is a side view of a dressing room attachment embodying the invention, as attached to the side of an automobile, the curtains and the outer hanger stretcher being removed to illustrate the attachment parts;

Fig. 2 is a view including a vertical transverse section through the automobile and an end view of the attachment apparatus;

Fig. 3 is a detail sectional view of one of the attachment hooks for engagement with the rain gutter of the vehicle;

Fig. 4 is a detail fragmentary sectional view of the lower bead-bearing connection;

Fig. 5 is a plan view of the apparatus as attached to the side of a vehicle;

Fig. 6 is a fragmentary end view of the bracket structure;

Fig. 7 is a detail plan view of the outer corner connections;

Fig. 8 is a detail horizontal sectional view on line 8—8 of Fig. 7; and

Fig. 9 is a detail sectional view of one of the extensible slip joints in the longitudinal connecting bars of the frame structure.

Referring now to the drawings in detail, I have shown therein, as an example of one form in which the invention may be embodied, an attachment for a vehicle A, comprising generally a pair of supporting bracket units B, a curtain supporting frame C carried by the brackets B, and a series of curtain panels, indicated collectively at D, hung from the supporting frame C.

The vehicle A may include a body 10 having a top 11 arched downwardly at the respective sides of the vehicle and terminating in a rain gutter 12 along the upper margins of the sides of the vehicle. Just below the windows 13 there is customarily a trim strip 14 which is continued along the doors 15 as well as the fixed portions of the body, and this trim strip provides a bearing surface against which the bracket structure B is fulcrumed, although it will be understood that in the absence of a trim strip, the bracket structure could be rested directly against the painted metal surface of the body and doors.

The brackets B are of "right" and "left" relation to one another and each comprises a staff 17 provided at its lower end with a fulcrum fitting 18 to bear against trim strip 14 and having, intermediate its ends, a grapple 19 adapted to interlock with rain gutter 12. Near its upper end, staff 17 is provided with a laterally extending socket 20 for coupling to a respective end of curtain hanger frame C. Slightly below socket 20, a bridge 21 connects the upper end of staff 17 to a brace rod 22 which extends downwardly and diagonally to the lower end of staff 17, to which it is secured through an L-bend 23, just above fitting 18. Brace 22 has a tip 24 (Fig. 7) projecting upwardly above bridge 21 to provide cantilever support for hanger frame C outboard from socket 20, as will be more specifically described hereinafter.

Bridge 21 is disposed outwardly of the vertical plane in which an end panel of curtain assembly D hangs, so as not to interfere with the curtain. To this end, the bridge includes, at its respective ends, elbows 25 which are secured to the outer sides of staff 17 and brace rod 22 respectively (Fig. 8).

Grapple 19 includes a stem 26 secured to staff 17 and projecting, in the common plane of rods 17 and 22, away from rod 22; together with a C-shaped clasp of strap metal, welded to the outer end of stem 26 and including a semi-cylindrical hook 27, a web 28 extending from one end thereof, and a guard finger 29 which extends from the lower end of web 28, substantially at right angles thereto, beneath the hook 27 and spaced therefrom by a gap which receives the gutter 12. The gap in the clasp is of a width such that, with the end of hook 27 resting in the gutter 12 as indicated in Fig. 3, the end of guard finger 29 will substantially engage the bottom of the gutter 12 to prevent the hook 27 from moving upwardly. Thus the hook 27 is secured against disengagement from the gutter except upon upward tilting movement of the bracket unit B to a position approximately as indicated in dotted lines in Fig. 3, in which the guard finger 29 may clear the outer side of the gutter 12 and permit the hook 27 to be lifted from the gutter. Clasps 27, 28, 29 may have an internal protective lining 30 of a soft material (such as rubber, thermoplastic or leather) to avoid scratching of the gutter 12.

Fulcrum fitting 18 includes a socket 31, a stem 32 connected thereto by an elbow 33, and a pad 34 secured to the end of stem 32 in a position for bearing against trim strip 14. Pad 34 may have a protective facing 35 of soft material to avoid scratching of the trim strip.

Socket 31 is of sufficient length to provide for telescopic adjustment of the effective length of bracket B between the bearing points thereof, i. e., the hook 27 and the pad 34. Fitting 18 is not required to support the weight of the bracket B or the load carried thereby. It functions only as a fulcrum for the lower end of the bracket to properly position the same with respect to grapple 19 so that the upper end of the bracket will provide a horizontal support for the curtain hanger frame C. Accordingly, the lower end of staff 17 may assume any position in socket 31 which provides the proper vertical location of pad 34 to register with the trim strip 14 of the particular automobile to which the apparatus is attached.

The entire dead weight of the brackets and their load is carried by the grapples 19 and gutter 12.

Supported upon the brackets B is a rectangular horizontal frame structure including the curtain hanger frame C, which is C-shaped, including end rods 37 and a front spar 39 extending between and joining the outer ends thereof. The rectangular frame structure also includes a rear or inner spar 38 which extends between and joins the inner ends of end rods 37 but usually forms no part of the curtain hanger frame C.

Spars 38 and 39 are adjustable for length, each comprising two sections, one of which is indicated at 40, has its inner end (Fig. 9) secured to an extension tube 41 and the other of which, indicated at 42, has its inner end telescoped into extension tube 41. Thus the spars can be adjusted to lengthen or shorten the end closure.

Each of the end rods 37 has, near its inner end, a socket 43 secured thereto and projecting downwardly from the plane of the hanger frame, to receive the tip of bracket brace rod 22; and has a tip 44 which projects rearwardly from socket 43 and is receivable in socket 20 of the bracket B. Thus the inner ends of end rods 37 are attached to and supported by the respective brackets B.

In each of the brackets B, staff 17 has an end portion 45 projecting upwardly above socket 20 and receivable in a socket 46 projecting downwardly from a respective end of the inner spar 38. Sockets 46 are connected to the respective spar sections 42, 40, by elbows 47 (Fig. 1). At this point it may be noted that, in Fig. 1, the curtain hanger frame D is not shown, the bracket B and connecting spar 38 being seen.

At their outer ends, end rods 37 have tips 48 which are received in sockets 49 on the ends of front spar 39 (Fig. 6) the sockets 49 being joined to the respective spar sections 42 and 40 by elbows 50. Tips 48 project beyond the junctions where inwardly offset end portions 51 of corner fingers 52 are secured to the end rods 37. Corner fingers 52 extend parallel to and are spaced outwardly from the tips 48 and have arcuate end portions 53 of curvature concentric with that of elbows 50 and spaced therefrom.

A series of curtain hanger rings 54 are strung upon end rods 37, upon front spar 39, and upon corner fingers 52. The series of curtains D include side panels 55 and a front panel or panels 56, attached to hanger rings 54 and thereby suspended from the hanger frame C.

It will now be apparent that, with the automobile forming one side thereof, the suspended curtains will define a rectangular enclosure which may be used as a dressing room, or for showering. If desired, an additional curtain may be suspended upon spar 38, to provide the fourth side of the enclosure, and to protect the automobile from splashing water. At the outer corners of the enclosure, curtains suspended on the spar 39 may be drawn around elbows 50 and onto tips 48 so as to amply overlap the forward side of the end curtains where they follow the corner fingers 52. The forward margins of these end curtains may be anchored by having terminal rings secured in apertures 57 in the ends of fingers 52.

There are preferably two front panel curtains, meeting at the center of spar 39 and adapted to be drawn apart to provide entry and egress. A back curtain 58 is suspended from the inner spar and may hang as shown in Fig. 1 to cover the windows of vehicle A or be draped over the front spar 39 to provide a canopy over the top of the enclosure.

In disassembling the apparatus, the front spar 39 is detached by pulling the sockets 49 loose from the tips 48, wrapping the curtains 56 around the spar sections 40 and 42 after separating them from one another, and stowing. Spar 38 is then lifted clear of the tips 45 and disassembled. The end rods 37 are then detached from brackets B by lifting their outer ends, rotating them upwardly around the axis defined by the gutter until sockets 43 come loose from the tips 24, and the end portions 44 are then withdrawn from sockets 20. Curtains 55 may then be wrapped around rods 37 and these parts stowed.

Brackets B are then removed from the automobile by tilting them upwardly as previously described, and by lifting the hooks 27 out of gutters 12.

The brackets may then be stowed and the entire apparatus is ready for transportation.

By shifting the spar sections 42 in extension tubes 41, the length of the enclosure may be adjusted so as to position the brackets B at selected positions along the length of the automobile.

It will now be apparent that each of the brackets B is of cantilever bracket form, with a relatively wide supporting head at its upper end having means (socket 20 and tip 22) for cantilever-support connection to the inner end portions of the end rods 37 of the hanger frame in a manner to adequately support the hanger frame with a cantilever action; including the staff 17 and brace rod 22 converging downwardly to a point of mutual connection from which support is transmitted upwardly to the outer side of the supporting head; and including the grapple 19 which, under load, interlocks with the gutter 12 to prevent the bracket pulling away from the side of the automobile, while the bearing pad 34 at the lower end of the bracket bears inwardly against the side of the automobile under the turning moment applied to the bracket by the load, thus providing a fulcrum bearing which properly positions the bracket for supporting the hanger frame C in a horizontal plane projecting outwardly from the side of the automobile near the top thereof. At the same time, the frame C, of C-shape, with end rods 37 gripped by the sockets 49 and thereby maintained by connecting spar 39 at right angles thereto, will serve to maintain the brackets B in vertical planes normal to the longitudinal axis of the vehicle, preventing the respective brackets from swinging laterally around the axes of the supporting hook and fulcrum bearing points of connection of the brackets to the vehicle. Thus the entire structure, when assembled, is adequately stable to support the curtains D in the form of a rectangular enclosure. Since the curtains may be of lightweight sheet material (e. g. rubber hydrochloride film or other extremely lightweight waterproof sheet material) the loads imposed upon the supporting structure are quite small and thus the frame structure itself may be of relatively lightweight rod or tubing, and any sagging or downward flexing of the hanger frame will be negligible.

I claim:

1. For attachment to an automobile having a side, a top joined thereto along its upper margin and a rain gutter extending along said joinder margin: a knock-down dressing room apparatus comprising a curtain hanger frame including end rods and a longitudinal spar for joining the outer ends thereof in a U-shaped open frame structure; and a pair of attachment brackets each including, at its upper extremity, a relatively wide head portion having means for detachable attachment to and cantilever support of an inner end portion of a respective end rod, having a relatively narrow lower end portion provided with a pad for fulcrum bearing against the side of the automobile at a distance below said gutter, and having, intermediate said head and lower end portions a hook adapted to interlock with said gutter in a manner to support the weight of the respective bracket and its load and to retain the same against horizontal detachment from the gutter when said fulcrum engagement of the pad is established, whereby said hanger may be cantilever-supported in a horizontal plane near the top of the car and projecting away from the side of the automobile to provide support for curtains to enclose the ends and outer side of a space adjoining said side of the automobile, said cantilever support connection between each bracket and a respective end rod comprising a socket on the inner side of the bracket extending horizontally toward the outer side thereof and adapted to receive the inner end of the respective end rod; a socket on the underside of the said inner end, spaced outwardly from said inner end and projecting downwardly; and a tip extending upwardly from the outer side of the respective bracket and receivable in said downwardly projecting socket.

2. For attachment to an automobile having a side, a top joined thereto along its upper margin and a rain gutter extending along said joinder margin: a knock-down dressing room apparatus comprising a curtain hanger frame including end rods and a longitudinal spar for joining the outer ends thereof in a U-shaped open frame structure; and a pair of attachment brackets each including, at its upper extremity, a relatively wide head portion having means for detachable attachment to and cantilever support of an inner end portion of a respective end rod, having a relatively narrow lower end portion provided with a pad for fulcrum bearing against the side of the automobile at a distance below said gutter, and having, intermediate said head and lower end portions, a hook adapted to interlock with said gutter in a manner to support the weight of the respective bracket and its load and to retain the same against horizontal detachment from the gutter when said fulcrum engagement of the pad is established, whereby said hanger may be cantilever-supported in a horizontal plane near the top of the car and projecting away from the side of the automobile to provide support for curtains to enclose the ends and outer side of a space adjoining said side of the automobile, said cantilever support connection means comprising two pairs of tip and socket elements each including a socket and a tip receivable therein, with one of the elements of each pair being attached to a respective bracket and the other element of each pair being attached to the respective end rod of the curtain hanger.

3. For attachment to an automobile including a side, a top joined thereto along its upper margin and a rain gutter extending along said joinder margin: means for supporting a plurality of curtains for defining an enclosure along said side of the automobile, said means including a hanger frame composed of a pair of end rods and an outer longitudinal spar for joining and extending between the outer ends of said rods, said end rods and spar being adapted to support respective curtain panels; and a pair of attachment brackets of generally cantilever truss form each including a staff and a brace rod joined to one another near the lower end of the bracket and extending upwardly in diverging relation, and a bridge bar extending transversely between said staff and brace rod and joined to the upper ends thereof, a fitting connected to the lower end of the bracket, projecting laterally therefrom on the opposite side from said brace rod and having a bearing pad for fulcrum engagement against the automobile side at a distance below said gutter, another fitting secured to said staff, projecting laterally on said opposite side and having at its end a hook adapted to interlock in said gutter with a load-supporting and horizontal detachment resisting connection with the gutter, whereby said hook and pad fitings may cooperate to cantilever-support said bracket and its load when the bracket is held against swinging laterally on the vertical axis of the points of hook and bearing connection respectively; and means providing detachable cantilever-support connections between the inner end portions of said end rods and the upper ends of said staff and brace rod respectively, whereby said hanger frame may function to maintain said brackets against such lateral swinging while being cantilever-supported with the major portion thereof extending outwardly away from the car in a horizontal plane near the top thereof to provide the support for said curtains, said last means comprising tips on said stop and brace bar, projected upwardly above the respective bridge bar, the respective end rod at the hanger frame having a downwardly projecting socket space from its inner end and adapted to receive the upwardly projecting tip of the brace bar, and the upwardly projecting tip of the staff having a socket projecting parallel to the bridge bar and toward the tip of the brace rod and adapted to receive the inner end of the respective side rod of the hanger frame.

4. Apparatus as defined in claim 3, wherein said tips of the staffs project upwardly beyond their respective sockets; and an inner longitudinal spar having at its respective ends, downwardly projecting sockets adapted to receive said staff tips for joining and longitudinally spacing the respective brackets.

5. For attachment to an automobile including a side, a top joined thereto along its upper margin and a rain gutter extending along said joinder margin: means for supporting a plurality of curtains for defining an enclosure along said side of the automobile, said means including a hanger frame composed of a pair of end rods and an outer longitudinal spar for joining and extending between the outer ends of said rods, said end rods and spar being adapted to support respective curtain panels; and a pair of attachment brackets of generally cantilever truss form each including a staff and a brace rod joined to one another near the lower end of the bracket and extending upwardly in diverging relation, and a bridge bar extending transversely between said staff and brace rod and joined to the upper ends thereof, a fitting connected to the lower end of the bracket, projecting laterally therefrom on the opposite side from said brace rod and having a bearing pad for fulcrum engagement against the automobile side at a distance below said gutter, another fitting secured to said staff, projecting laterally on said opposite side and having at its end a hook adapted to interlock in said gutter with a load-supporting and horizontal detachment resisting connection with the gutter, whereby said hook and pad fittings may cooperate to cantilever-support said bracket and its load when the bracket is held against swinging laterally on the vertical axis of the points of hook and bearing connection respectively; and means providing detachable cantilever-support connections between the inner end portions of said ends rods and the upper ends of said staff end brace rod respectively, whereby said hanger frame may function to maintain said brackets against such lateral swinging while being cantilever supported with the major portion thereof extending outwardly away from the car in a horizontal plane near the top thereof to provide the support for said curtains, said cantilever support connections including two pairs of socket and tip elements, the tip elements being receivable in the socket elements and one element of each pair being secured to a respective bracket and the other element of each pair being secured to a respective side bar.

6. For attachment to an automobile including a side, a top joined thereto along its upper margin and a rain gutter extending along said joinder margin: means for supporting a plurality of curtains for defining an enclosure along said side of the automobile, said means including a hanger frame composed of a pair of end rods and an outer longitudinal spar for joining and extending between the outer ends of said rods, said end rods and spar being adapted to support respective curtain panels; and a pair of attachment brackets of generally cantilever truss form each including a staff and a brace rod joined to one another near the lower end of the bracket and extending upwardly in diverging relation, and a bridge bar extending transversely between said staff and brace rod and joined to the upper ends thereof, a fitting connected to the lower end of the bracket, projecting laterally therefrom on the opposite side from said brace rod and having a bearing pad for fulcrum engagement against the automobile side at a distance below said gutter, another fitting secured to said staff, projecting laterally on said opposite side and having at its end a hook adapted to interlock in said gutter with a load-supporting and horizontal detachment resisting connection with the gutter, whereby said hook and pad fittings may cooperate to cantilever-support said bracket and its load when the bracket is held against swinging laterally on the vertical axis of the points of hook and bearing connection respectively; and means providing detachable cantilever-support connections between the inner end portions of said end rods and the upper ends of said staff and brace rod respectively, whereby said hanger frame may function to maintain said brackets against such lateral swinging while being cantilever supported with the major portion thereof extending outwardly away from the car in a horizontal plane near the top thereof to provide the support for said curtains, said bridge bar being in the form of a shallow U, with elbows at its respective ends secured to the upper end portions of said staff and brace bar respectively, with the body of the bridge thus offset laterally from the common plane of said staff and brace bar, so as to avoid interference with a curtain hanging in immediate adjacency to said plane.

7. For attachment to an automobile including a side, a top joined thereto along its upper margin and a rain gutter extending along said joinder margin: means for supporting a plurality of curtains for defining an enclosure along said side of the automobile, said means including a hanger frame composed of a pair of end rods and an outer longitudinal spar for joining and extending between the outer ends of said rods, said end rods and spar being adapted to support respective curtain panels; and a pair of attachment brackets of generally cantilever truss form each including a staff and a brace rod joined to one another near the lower end of the bracket and extending upwardly in diverging relation, and a bridge bar extending transversely between said staff and brace rod and joined to the upper ends thereof, a fitting connected to the lower end of the bracket, projecting laterally therefrom on the opposite side from said brace rod and having a bearing pad for fulcrum engagement against the automobile side at a distance below said gutter, another fitting secured to said staff, projecting laterally on said opposite side and having at its end a hook adapted to interlock in said gutter with a load-supporting and horizontal detachment resisting connection with the gutter, whereby said hook and pad fittings may cooperate to cantilever-support said bracket and its load when the bracket is held against swinging laterally on the vertical axis of the points of hook and bearing connection respectively; and means providing detachable cantilever-support connections between the inner end portions of said end rods and the upper ends of said staff and brace rod respectively, whereby said hanger frame may function to maintain said brackets against such lateral swinging while being cantilever supported with the major portion thereof extending outwardly away from the car in a horizontal plane near the top thereof to provide the support for said curtains, the said bearing pad fitting of each bracket comprising telescoping socket and tip elements, one of said elements constituting a downward extension of the lower end of the respective bracket, and an elbow stem joining the other of said elements to its respective bearing pad, said socket element receiving said tip element and providing a longitudinally expansible connection between the respective bracket and its respective bearing pad.

8. In a dressing room attachment for an automobile having a side, a top joined to the upper margin of said side, and a rain gutter extending along said upper margin: a C-shaped curtain hanger frame including end rods and a longitudinal spar for joining the outer ends thereof; and a pair of brackets each having a head, provided with means for detachable attachment to and cantilever support of the inner end portions of said end rods, having a hook adapted to be received in and to rest in said gutter, having a portion projecting below said hook and provided with a bearing pad for resting against the side of the automobile, and having a locking finger rigidly associated with said hook and projecting below the hook in vertically spaced relation thereto, for locking engagement with the underside of said gutter to prevent release of the hook from the gutter except when the lower portion of the bracket is tilted laterally away from said side of the automobile and upwardly around the axis of bearing engagement of the hook against the gutter.

9. In a knock-down dressing room attachment for an automobile having a side, a top and a rain gutter extending along a lateral margin of said top where it joins said side; a pair of brackets of generally inverted triangular form, each including an apex portion at its lower extremity and a pad attached to said apex portion and adapted to provide fulcrum bearing engagement with the automobile side at a distance below said gutter, a head at the top of the bracket, having attachment means, and a grapple intermediate said apex and base portion and projecting laterally, said grapple being of C-form, including a hook engageable in said gutter to support the weight of the bracket and its load, including a web secured to the bracket, and including a locking finger projecting from said web beneath said hook and separated therefrom by a space wider than the thickness of the gutter wall but narrower than the height of the gutter, said locking finger being engageable with the underside of said gutter to prevent release of the hook from the gutter except upon tilting movement of the lower portion of the bracket laterally away from the said side of the automobile and upwardly around the axis of bearing engagement of the hook against the gutter; and a curtain hanger frame including respective end rods having means for attachment to and reception of cantilever support from said attachment means of the respective brackets, and loading said brackets to resist said tilting movement so as to maintain said grapple locked to said gutter.

10. For attachment to an automobile including a side, a top joined thereto along its upper margin and a rain gutter extending along said joinder margin: means for supporting a plurality of curtains for defining an enclosure along said side of the automobile, said means including a hanger frame composed of a pair of end rods and an outer longitudinal spar for joining and extending between the outer ends of said rods, said end rods and spar being adapted to support respective curtain panels; and a pair of attachment brackets of generally cantilever truss form each including a staff and a brace rod joined to one another near the lower end of the bracket and extending upwardly in diverging relation, and a bridge bar extending transversely between said staff and brace rod and joined to the upper ends thereof, a fitting connected to the lower end of the bracket, projecting laterally therefrom on the opposite side from said brace rod and having a bearing pad for fulcrum engagement against the automobile side at a distance below said gutter, another fitting secured to said staff, projecting laterally on said opposite side and having at its end a grapple including as the upper portion thereof, a hook adapted to interlock in said gutter with a load-supporting and horizontal detachment resisting connection with the gutter, whereby said hook and pad fittings may cooperate to cantilever-support said bracket and its load when the bracket is held against swinging laterally on the vertical axis of the points of hook and bearing connection respectively; and means providing detachable cantilever-support connections between the inner end portions of said end rods and the upper ends of said staff and brace rod respectively, whereby said hanger frame may function to maintain said brackets against such lateral swinging while being cantilever supported with the major portion thereof extending outwardly away from the car in a horizontal plane near the top thereof to provide the support for said curtains; said grapple further including a web portion extending downwardly from the outer extremity of said hook and a locking finger extending inwardly from said web portion and beneath the free end of said hook and engageable with the underside of said gutter to prevent disengagement of said hook from the gutter when the bracket is in its cantilever-support position, said hook being detachable from the gutter by tilting the lower end of the bracket outwardly and upwardly from the side of the automobile until said locking finger is in a position to clear the outer side of the gutter and permit the hook to be lifted upwardly from the gutter.

References Cited in the file of this patent

UNITED STATES PATENTS

| | | |
|---|---|---|
| 1,383,324 | Martell | July 5, 1921 |
| 1,640,660 | Johnson | Aug. 30, 1927 |
| 1,733,007 | Dahl | Oct. 22, 1929 |
| 1,935,948 | Hyrup | Nov. 21, 1933 |
| 2,315,680 | Ward | Apr. 6, 1943 |
| 2,764,331 | Bigos | Sept. 25, 1956 |
| 2,770,244 | Carson | Nov. 13, 1956 |